United States Patent [19]

Winterberg et al.

[11] Patent Number: 5,493,972
[45] Date of Patent: Feb. 27, 1996

[54] METHOD FOR PRODUCING MAXIMUM ENERGY FLOWS

[75] Inventors: Friedwart Winterberg, Reno, Nev.; Gunter Hoff; Axel Hoff, both of Daisendorf, Germany

[73] Assignee: Buck Werke GmbH & Co., Germany

[21] Appl. No.: 79,006

[22] Filed: Jun. 18, 1993

Related U.S. Application Data

[63] Continuation-in-part of Ser. No. 452,729, Dec. 19, 1989, abandoned.

[30] Foreign Application Priority Data

Dec. 19, 1988 [DE] Germany ............ 38 42 670.6

[51] Int. Cl.$^6$ .................... F42B 1/00; D03D 29/00
[52] U.S. Cl. ...................... 102/305; 149/109.2
[58] Field of Search ............ 102/305; 149/109.2

[56] References Cited

U.S. PATENT DOCUMENTS

| | | | |
|---|---|---|---|
| 4,052,139 | 10/1977 | Paillaud et al. | 431/2 |
| 4,487,938 | 12/1984 | Boileau et al. | 548/304 |
| 4,552,742 | 11/1985 | Mayer | 548/304 |
| 5,221,810 | 6/1993 | Spahn | 102/475 |
| 5,271,332 | 12/1993 | Guirguis | 102/476 |

FOREIGN PATENT DOCUMENTS

| | | |
|---|---|---|
| 1033565 | 1/1951 | France. |
| 2290945 | 11/1974 | France. |
| 2418292 | 5/1976 | Germany. |
| 2939840 | 4/1981 | Germany. |

OTHER PUBLICATIONS

Kalisky et al—"Exclmer Laser Photolysis Studies of Photo Induced Aggregation in Polymers Containing Spiropyran Units" Conference on Lasers and Electro–Optics, May 21–24, 1985 Baltimore, Maryland.

Helvajian, H., "Laser Assisted Gas–Phase Reactions in Mercury/Mercury Dibromide Mixtures" Conference on Lasers and Electro–Optics, May 21–24, 1985, Baltimore, Maryland.

*Primary Examiner*—Peter A. Nelson
*Attorney, Agent, or Firm*—Pepe & Hazard

[57] ABSTRACT

The invention relates to a method of producing maximum energy flows by releasing chemically stored energy—for example out of explosives—by a photon-controlled reaction which is propagated by the photons released by the reaction and at a velocity for the reaction front which is substantially above 10 km/sec.

36 Claims, 1 Drawing Sheet

METHOD FOR PRODUCING MAXIMUM ENERGY FLOWS

The present application is a continuation-in-part of our application Ser. No. 07/452,729 filed Dec. 19, 1989, now abandoned.

BACKGROUND OF THE INVENTION

The invention relates to a method of producing maximum energy flows which is based on the combination of the high energy content present in explosives and similar chemical compounds with the high call-up speed of the reaction (close to the velocity of light) which can be achieved by electromagnetic processes. By this method, energy flows which are otherwise available only in nuclear reactions can be produced for the first time through chemical reactions. This present the possibility of achieving states of matter which could hitherto not be achieved by conventional means and is important, for example, for new materials, the pumping of X-ray lasers and the principle of laser fusion (focussing photons on the smallest volumes).

The call-up of energy in the form of a detonation wave from conventional explosives is known. All experiments show, however, that the detonation velocity of 10 km/s cannot be exceeded. As a result, the energy flow which can be achieved is greatly limited despite the high energy content of the explosives. Research into increasing the power of explosives by increasing the detonation velocity was abandoned years ago and instead all work is concentrated on making the explosives safer, i.e., on stabilizing them.

According to Sanger (Z. Naturforsch. 8a (1953), 204–206), the detonation is propagated by the radiation emitted by the reaction front which has a heat of about 100,000K. As a result of absorption of this radiation in the region in front of the reaction front, the explosive there is vaporized and the reaction is initiated. Since the thermal luminescence of the reaction front, at about 23 nm, is in the far UV range in which all matter is opaque, the free path length of the photons is very short. Therefore, the progression of the reaction front takes place at the velocity of about 10 km/s which is low in comparison with the velocity of light.

Furthermore, it is known that by utilizing electromagnetic processes—that is to say during the release of energy by photons—in transparent materials, the call-up of the stored energy is possible at the velocity of light. This method is in standard use in the laser; here, however, the flow of energy which can be achieved is limited by the relatively low energy density in the laser-capable states. The facts that high electrical powers and large active volumes are needed for the operation of maximum power lasers also has a disturbing effect and hinders the mobile use of such systems.

The attempt to use the energy stored in nuclear explosive charges for the pumping of an X-ray laser, also does not lead to any substantial improvement since the necessary use of nuclear reactions rules out the civilian use of such systems.

It is the object of the invention to combine the high energy density of explosives and the high energy call-up speed of the laser in a manner which leads to a system which can be used in practice.

SUMMARY OF THE INVENTION

According to the invention, this problem is solved in that substances and conditions are selected for the reaction in which the initiation of the reaction, the progression of the reaction front and the extraction of energy from the reaction zone are obtained by fields or waves travelling in principle at the velocity of light—i.e., photons—which are not in thermal equilibrium with the reacting substance and which therefore ensure the high speed of the energy release even under the conditions of the reaction. As a result of dispensing with the requirement of the laser capacity of the energy-rich states, a considerably broader spectrum of usable substances is available, which are, in addition, considerably easier to handle than laser-capable substances.

Energy-rich substances can advantageously be used for this purpose and they react while emitting photons of a defined range of wavelengths, at the same time giving off as high a proportion as possible of the energy stored in them, in the form of photons. The free path length for the photons released during the reaction is so long that, on the one hand, the energy can be effectively conveyed away in the form of photons, but, on the other hand, (for the development of the photon chain reaction described below) sufficient photons are still absorbed to ensure that the reaction is carried further.

The method according to the invention can be used in several forms. The most obvious form is the fully photon-controlled reaction wherein a reaction which delivers as high a proportion as possible of the released energy in the form of photons, is itself initiated by absorption of a photon.

In fact, detonations in explosives take place in accordance with such mechanisms except that the participating photons are in the UV range and are in thermal equilibrium with the detonating explosive. Because of the resulting short free path lengths for the radiation produced, the velocity of the detonation front of about 10 km/s results which is extremely slow in comparison with the velocity of light.

Computer simulations have shown, that a photon-induced chain reaction is possible wherein the speed of the energy call-up can be increased to close to the velocity of light if several prerequisites are fulfilled. The most important prerequisites for this are:

1. During the reaction, a photon multiplication must occur, i.e., the reaction must be able to be written summarily as educts+hv→products+n·hv with n>1.

2. The photons appearing during the reaction must not be in thermal equilibrium with the reacting substances, i.e., they must have relatively long mean free paths. This criterion excludes the photons in the UV range, for example, which are involved in the detonation of conventional explosives.

3. The reaction time, i.e., the average period of time between the absorption of a photon by a reactive molecule and the emission of the released photons must be relatively short (Ideally about $10^{-12}$ sec.), in order to obtain a high energy flow. The energy call-up speed can be calculated immediately from the mean free path $l$ and the reaction time $t_R$ in accordance with $$v_E = l \cdot c/(1 + t_R \cdot c).$$

(Thus the values for $l$ and $t_R$ do not each have to optimized separately; they merely have to be in such a relationship to one another so that as high an energy call-up speed as possible results.)

A further increase in the energy flow is achieved if a photon shock wave develops. Conditions for the development of such a shock wave are, on the one hand, the mirror-coating of the vessel walls in order to impress a privileged direction on the incoherent photons, and on the other hand, a high transparency of the reaction products than the educts for the photons i.e., a mean free path which is longer by about two orders of magnitude).

Under these circumstances, a photon chain reaction can be induced in suitable substances, i.e., an energy call-up in the form of a multiplication of the photons entering a substance with a simultaneous chemical reaction of the substance. In the normal case, this phenomenon is not observed because the photons produced are immediately absorbed again and heat up the region in front of the reaction front. Thus energy-rich substances must be sought which render possible a "cold detonation" during which the chemical energy is converted mainly into electromagnetic energy and not into thermal energy, or only to an insignificant extent into thermal energy.

For this reason, it is necessary for the photons released during the reaction to have as long a free path as possible in the substance which has already reacted. On the other hand, it is desirable for the efficiency of the chain reaction that the free path of the photons in the original substance should be short in order to achieve an effective detonation. Energy-rich substances must therefore be sought which satisfy as much as possible the three conditions:

1. a reaction which can be initiated by photons, which takes place with the emission of photons and during which photon multiplication results,
2. a short free path of the photons in the reacting substances,
3. a long free path of the photons in the reaction products i.e., the reaction products should be relatively transparent or permeable to the released photons.

The condition of the photon multiplication during the reaction greatly restricts the number of energy-rich substances which are suitable for the method described. In principle, however, a check must be made separately for each individual substance as to whether it meets the said conditions. Hereinafter, classes of substances and types of reactions are given which are particularly promising for the photon-controlled reaction, and instructions are given for a purposeful search for such substances.

The photon multiplication during the reaction can be achieved in a very simple manner for example if a reaction of the type of the chlorine detonating gas reaction is selected in accordance with the criteria set forth hereinafter. In this type of reaction, one molecule (chlorine generalized as AQ) decomposes after photon absorption, into two radicals which then each react independently with a further partner (hydrogen, generalized by XZ). If this reaction partner is selected so that in each consequent reaction a photon is again released, a photon multiplication factor of two results since two reactive radicals are formed per photon absorbed. As a result of this splitting into two component reactions in which the photon multiplication is independent of the second component reaction and the second reaction partner, the search for suitable substances is simplified considerably.

The actual chlorine detonating gas reaction can only serve as a model for this because during the reaction of the chlorine radicals with hydrogen, no suitable photons are released. Thus substances must be sought which can replace the hydrogen in this reaction and which release at least one photon during the reaction with a chlorine radical. The chlorine may also possibly be replaced by another substance which decomposes into two radicals after absorption of a photon.

The problem which may possibly arise during the chain reaction is that the wave length of the photons released during the reaction does not coincide with the wave length which is necessary to initiate the reaction this can be solved by the use of "moderators" by analogy with uranium fission. Substances which absorb the released photons and—for example by fluorescence with a sort time constant—convert them into photons of the wavelength suitable for the initiation of the reaction would be possible as such moderators here.

In addition, the conditions regarding the free paths for photons could be modified when using moderators which disintegrate of their own accord during the said wavelength transformation. In this case, the condition that the substance itself should be as impervious as possible for the initiating photons but as transmissive as possible for the released photons would suffice. This condition is perhaps easier to fulfill than the above-mentioned conditions and to this extent represents an alternative which should be taken into consideration in the search for suitable compounds.

Another important problem in photon chain reactions is that spontaneous detonation of the arrangement (for example by means of the photons from cosmic radiation which are always present) must be prevented in order to make the system safe to handle. According to the invention, this problem is solved by admixing saturable absorbers with the reactants, i.e., substances which can absorb a certain number of photons and become transparent after exceeding some number and become transparent after exceeding this threshold and no longer hinder the further reaction. Alternatively the reactive substance itself is given an inherent safety factor against spontaneous detonation. As computer simulations show, there are values for the characteristic reaction parameters at which the reaction initiated by a single photon comes to a stop after a short time and without appreciable effect, whereas the incidence of a hypercritical number of photons initiates the full chain reaction. With a suitable selection of the parameters, this mechanism could indicate a simple means of making the energy-rich substances used safe to handle. The quantum-mechanical effect of "self-induced transparency" may also be used here.

The safety of the substances can be improved by selecting an arrangement wherein the reaction between the educts cannot be initiated by incident photons in the normal case but in which, by using the piezoelectric effect for example, the configuration of the educts is altered on the application of an electrical field so that the firing of the reaction by photons becomes possible. In order to fire this arrangement, an electrical field would be applied and a powerful beam of light of suitable wavelength would be directed onto the substance simultaneously.

DETAILED DESCRIPTION OF THE ILLUSTRATED EMBODIMENTS

Figure 1:
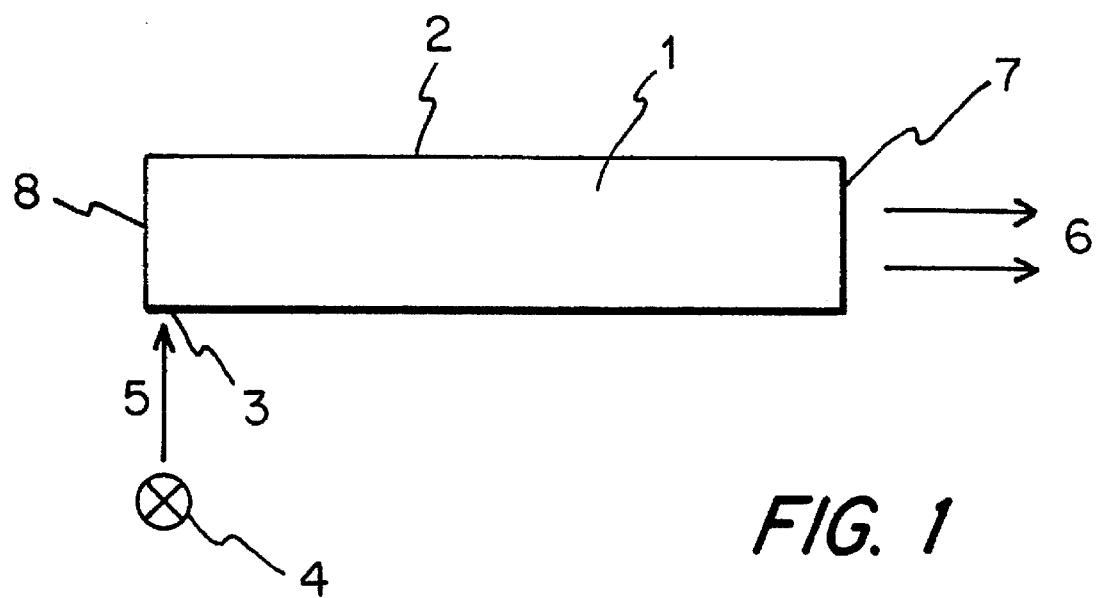
FIG. 1 is a diagrammatic view of apparatus for use in practicing the method of the present invention.

FIG. 1 shows in plan view one arrangement for practice of the method of the present invention. The reactive mixture of substances is in an elongated reaction vessel 1, the rear wall 8 and side walls 2 of which are mirror coated. A photon beam 5, produced by a suitable light source 4 and suitably directed and focussed, possibly by a lens or mirror system, can enter through a place 3, which is not mirror-coated or is only semi-transparent, at the rear of the vessel to initiate the reaction. The reaction front travels from the rear wall 8 to the front wall 7 which is not mirror-coated; the photons released nondirectionally in the course of this are guided to the front wall 7 by reflection from the walls 2 and 8. Because of the different free paths of the photons in the educts and products of the reaction, the mean velocity of the photons initially travelling backwards is greater than that of those travelling forwards from the beginning, so that, after reflection from the rear wall 8, the former overtake the latter. As a result, a photon shock wave builds up which finally emerges through the front wall 7 in the rough direction indicated by the arrow 6. Since the emitted photons are not coherent, the shock wave spreads out after leaving the vessel 1; the target to be subjected to the impact of photons is thus logically mounted directly in front of the front wall 7. In order to achieve an optimum effect on the target it will be desirable to adapt the width of the vessel approximately to the size of the target. The amount of material participating in the reaction can then be varied by varying the length of the vessel. In general, it will be logical to select the ratio of length to width as high as possible so that a relatively high photon density can be produced at the exit.

For the development of the invention in one embodiment, a place which is not mirror-coated or is only semi-transparent must be additionally provided in the reaction vessel—as illustrated in FIG. 1—through which place the photons needed to fire the reaction can enter.

The capacitors are not illustrated true to scale in the FIGURE; particularly in the case of firing by means of a travelling wave travelling at c/n in the direction 5, it may be necessary to make the length of a capacitor plates very short in comparison with the length of the vessel in order to achieve an optimum photon shock wave.

The reactions of the present invention may employ different reactant substances and different mechanisms, and they may be initiated by different energy sources.

Exemplary of the types of reactions which may be employed are the following:

1. decomposition of a chemical compound in accordance with the reaction $AQ+h\nu \to A+Q+n^*h\nu (n>1)$ wherein A, and Q, X, Z represent any individual atoms or groups of atoms.

2. Photon-induced decomposition of a substance into two or more radicals and the photon-releasing reaction of these radicals with one or more further substances in accordance with the reaction $h\nu + AQ \to A^* + Q$ $A^* + Q + XZ \to AX + QZ + 2 h\nu$ 3. A rearrangement of bonds between two molecules with a subsequent further reaction of the type $2AQ + 2 h\nu \to A_2 + 2Q^* + h\nu$ $2Q^{1*} + 2X \to 2QX + 2 h\nu$ 4. The use of an excimer.

5. An electron migration into the partially occupied, inner d-orbitals of compounds of the rare earths.

6. The steric transposition of orbitals in molecules present in solid form.

7. A frozen neutralization reaction.

8. Decomposition of a chemical compound according to the reaction $AQ \to A + Q + n\ h\nu\ (n>0)$.

9. Decomposition of a chemical compound, with subsequent further reaction according to the reaction $AQ \to A^* + Q^* + n\ h\nu\ (n>0)\ A^* + Q^* + XZ \to AX + QZ + m^*h\nu\ (m>0)$.

10. A reaction of radicals according to the reaction $A^* + Q\bullet \to AQ + n^*\ h\nu\ (n>0)$.

Exemplary of the types of reactants which may be employed are the following:

1. Iodazide type compounds are energy-rich substances.
2. Hypergolic propellants.
3. Noble gas compounds, for example noble gas halides or oxides.

As will be appreciated, other substances may also be used depending upon the desired reaction. Moreover, the mode of initiation will depend upon the reaction and reactant(s) selected.

1. Dioxetane Compounds

Dioxetane compounds are cyclic peroxides with organic radicals being bonded to the carbon atoms thereof. The simplest representative of this group is the known tetramethyl-1, 2-dioxetane (TMD) having the following structural formula:

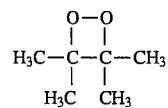

TMD is characterized by the feature that it allows a photodissociation with photons having wave lengths up to 2600 nm and that one of the acetone molecules resulting as dissociation products is present in the excited state and emits its energy through emission of light having a wave length of 400–450 nm. By the use of moderator molecules, the emitted photon having a wave length of 400–450 nm may be converted to up to 6 photons having a wave length of 2600 nm, these photons in turn being able to cause new photo-dissociations, so that the desired photon-induced chain reaction is achieved.

The technical realization by means of this chemical reaction may be effected in different manners. The simplest method is one in which a mixture of TMD and moderator molecules is put into a reaction vessel having the shape of an elongate cylinder. The ignition is effected through irradiation of light at the rear mirror coated end portion of the cylinder.

For converting a high-energetic photon to a plurality of low-energetic photons through interaction with suitable moderators, various physical principles may be employed.

For example, the interaction of light with an electron plasma in the solid body may be utilized; in the presence of a density gradient, a so called two plasmon decomposition is possible causing a frequency bisection. Another possibility for such a frequency bisection is offered by the Raman scattering in the plasma at ¼ of the critical density. (The critical density is the density at which the plasma frequence is equal to the frequency of the incident light).

Another especially favorable manner is the known so called "parametric down conversion" method. The moderator substances used are optical anisotropic crystals (such as ZnO, CdS, GaP, GaAs, Se) with non-disappearing non-linear optical susceptibility tensor $d_{ijk}\omega_3=\omega_1+\omega_2$. Here, the scattering frequency may continuously be changed through variation of the direction of incidence, so that the energy of the produced photons may optimally be adapted to the requirements of the reaction. Moreover, in contrast to the two first mentioned methods, this method is characterized by very high efficiency.

2. Noble Gas Compounds

Especially suitable are also noble gas reactions for carrying out a photon induced chain reaction. For example, reference is made to a reaction chain on the basis of the xenon difluoride. The initiation of reaction is effected by means of volume simultaneous ignition with photons:

$$XeF_2+h\nu_1 \rightarrow Xe+2\ F.$$

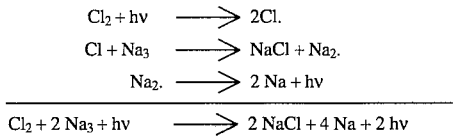

Here, the emission of the reaction products is within the range of 450–500 nm. A photon chain reaction is possible this way.

The reaction itself is then performed as linear reaction chain induced by fluorine radicals:

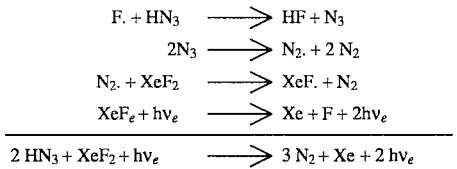

3. Chlorine Detonating Gas Type Reactions

As already described, a photon multiplication is easily achieved by the selection of a reaction of the type referred to as a chlorine detonating gas reaction. The specific advantage thereof is that by the division of the total reaction into two partial reactions, the photon multiplication may easily be achieved independently of the photon producing reaction; consequently, there is a broader field for a technical optimization of the system when selecting the photon producing reaction.

By way of example, reference is made to the following two reactions:

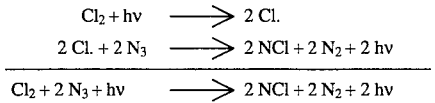

Having thus described the invention, what is claimed is:

1. A method of producing and directing a high energy flow by releasing energy in the form of photons from a reaction in energy rich reacting substances with a reaction front progressing substantially faster than 10 km/sec. comprising (a) placing a volume of energy rich reacting substances in a reaction chamber having a sidewall, an end wall at one end and an opening at the other end, said sidewall and end wall being reflective to photons;

(b) introducing photons into said reacting substances adjacent said end wall to initiate a reaction which releases energy as photons which are not in thermal equilibrium with said reacting substances, said reaction producing photon multiplication and the products of said reaction being permeable to the released photons, said released photons having a mean free path for reaction with said reacting Substances which is short compared to the photon mean free path for absorption;

(c) reflecting any released photons impinging upon said sidewall and end wall into said reacting substances, said released photons initiating further reaction of said reacting substances to continue said reaction with a reaction front progressing toward said opening at said other end, said reaction front progressing at a velocity $v_E$ in accordance with the equation $$v_E=\lambda \bullet c/(\lambda+t_r \bullet c)$$

wherein c=the velocity of light $\lambda$=mean free path of photons in said reacting substances $t_r$=mean time interval between the absorption of a photon and the emission of the photons released in the reaction; and (d) directing released photons generated by said reaction outwardly of said opening at said other end of said chamber in the form of a shock wave, said photons in said shock wave having much of the energy released by said reaction.

2. The method of producing maximum energy flows in accordance with claim 1 wherein the energy-releasing reaction is a steric transposition of orbitals in molecules present in solid form.

3. The method of producing maximum energy flows in accordance with claim 1 wherein said energy release is effected in the form of a chain reaction, and wherein said reaction is initiated by a photon and more than one photon of the same wave length is released by the reaction.

4. The method of producing maximum energy flows in accordance with claim 1 wherein the reaction products are substantially more permeable to photons generated during the reaction than the starting reacting substances so that the photons emerging from the entire volume of said reaction substances behind the reaction front pile up to form a photon shock wave.

5. The method of producing maximum energy flows in accordance with claim 1 wherein photons initiate the reaction and the released photons have a wavelength different from that of the inducing photons, and wherein the wavelength of released photons will initiate further reactions.

6. The method of producing maximum energy flows in accordance with claim 1 wherein photons initiate the reaction and the released photons have a wavelength different from that of the inducing photons, and wherein the wavelength of the released photons is transformed to wavelengths which can initiate further reactions.

7. The method of producing maximum energy flows in accordance with claim 6 wherein said transformation is effected by quantum mechanical processes in moderator molecules.

8. The method of producing maximum energy flows in accordance with claim 7 wherein both the energy rich reactive substances and the reaction products are permeable to the released photons and wherein the moderator molecules disintegrate during the wavelength transformation, so that energy call-up and initiation of the chain reaction may be matched to one another and the photons emerging from the volume behind the reaction front pile up to form a photon shock wave.

9. The method of producing maximum energy flows in accordance with claim 8 wherein the build-up of the photon shock wave is assisted by an increase in the refractive index of the medium in front of the reaction front in comparison with that behind the reaction front.

10. The method of producing maximum energy flows in accordance with claim 9 wherein said refractive index is increased by including additional substances which decompose on passage through the reaction front and which have a higher refractive index than their decomposition products.

11. The method of producing maximum energy flows in accordance with claim 9 wherein the build-up of the photon shock wave is assisted by including other substances in the reacting substances to absorb the photons released during the reaction and to release them again after passage through one of the reaction front and photon shock wave.

12. The method of producing maximum energy flows in accordance with claim 11 wherein said other substances temporarily store the photons by change-over into metastable excited states.

13. The method of producing maximum energy flows in accordance with claim 1 wherein self-focussing of the photons occurs at high photon densities as a result of the effect of non-linear optics (Bose-Einstein condensation), and is utilized to increase further the energy flow achievable by the reaction.

14. The method of producing maximum energy flows in accordance with claim 1 wherein the energy-rich reacting substances are a solid in which the reaction takes place by rearrangement of the electronic molecular orbitals without significant change in place of the atomic nuclei, said reaction being induced by photons and emitting photons in a short time period.

15. The method of producing maximum energy flows in accordance with claim 1 wherein the energy-releasing reactions are "frozen", to prevent them from reacting prematurely by one of cooling and alignment of the electron spins.

16. The method of producing maximum energy flows in accordance with claim 15 wherein the spins are aligned in a strong magnetic field.

17. The method of producing maximum energy flows in accordance with claim 1 wherein said energy rich substances are selected from one of piezoelectrical or magnetostrictive, and wherein the step of initiation of the reaction is effected in part by producing alteration of an energetically unstable state of the reacting substances by a sudden variation in one of an external electrical field and external magnetic field.

18. The method of producing maximum energy flows in accordance with claim 1 wherein the energy-releasing reaction is a frozen neutralization reaction wherein the reacting substances are homogeneously mixed in a non-reactable state and are stored until their use, and wherein the non-reactability being achieved by one of cooling and alignment of the electron spins.

19. The method of producing maximum energy flows in accordance with claim 18 wherein the spins are aligned in a strong magnetic field.

20. The method of producing maximum energy flows in accordance with claim 1 characterized in that the energy releasing reaction contains a reaction of radicals according to the pattern $$A^\cdot + Q \rightarrow AQ + k \cdot h\nu \, (k > o).$$

21. The method of producing maximum energy flows in accordance with claim 1 wherein the energy-rich substances are noble gas compounds.

22. The method of producing maximum energy flows in accordance with claim 21 wherein said noble gases are noble gas halides or noble gas oxides.

23. The method of producing maximum energy flows in accordance with claim 1 wherein the risk of spontaneous firing of the energy-rich reacting substances is avoided by an initial state wherein individual photons are absorbed by the reacting substance and only larger amounts of photons can initiate the chain reaction is adjusted by suitable selection of the reaction parameters.

24. The method of producing maximum energy flows in accordance with claim 1 wherein spontaneous firing of the energy-rich reacting substances is avoided by including saturatable absorbers to absorb the individual incident photons and the reaction products thereof, whereby a reaction initiated accidentally with low radiation intensities may be terminated.

25. The method of producing maximum energy flows in accordance with of claim 1 wherein the quantum-mechanical process of the self-induced transparency is utilized to prevent an undesired spontaneous reaction while achieving the desired high transmissiveness of the substances to photons after initiation of the reaction.

26. The method of producing maximum energy flows in accordance with claim 1 wherein the firing is effected by brief irradiation with high photon densities.

27. The method of producing maximum energy flows in accordance with claim 1 wherein the initiation of the reaction is effected by incidence of an intensive directional photon wave, whereby the shape of the reaction front and the direction of its progression are determined so that the photons released during the reaction accumulate to form a photon shock wave.

28. The method of producing maximum energy flows in accordance with claim 1 wherein the reacting substances are disposed within a reaction vessel which is mirror-coated at its sides and at one end, whereby the geometry controls the emission direction for the photons.

29. The method of producing maximum energy flows in accordance with claim 28 wherein said vessel cross section is that of one of an elongate parallelpiped and cylinder and said vessel is provided with a non-mirror-coated opening for the entry of photons needed for the firing.

30. The method of producing maximum energy flows in accordance with claim 1 wherein the energy-rich reacting substances are propellants of the hypergolic type.

31. The method of producing maximum energy flows in accordance with claim 1 wherein the energy-releasing reaction is the decomposition of a chemical compound in accordance with the reaction:

$$AQ + h\nu \rightarrow A + Q + n^* h\nu \, (n>1)$$

wherein A and Q are atoms or groups of atoms.

32. The method of producing maximum energy flows in accordance with claim 1 wherein photon multiplication results from an energy-releasing reacting comprising the photon-induced decomposition of a substance into two or more radicals and the photon-releasing reaction of these radicals with one or more additional substances in accordance with the reactions $$hv + AQ \rightarrow A^* + Q^*$$

$$A^* + Q^* + XZ \rightarrow AX + QZ - 2\, hv$$

wherein A, Q, X and Z are atoms or groups of atoms.

33. The method of producing maximum energy flows in accordance with claim 1 wherein the energy-releasing reaction is a rearrangement of bonds between two molecules with a subsequent further reaction of the type $$2\, AQ + 2\, hv \rightarrow A_2 + 2Q^* + hv$$

$$2\, Q^* + 2X \rightarrow 2QX + 2\, hv$$

wherein A, Q and X are atoms or groups of atoms.

34. The method of producing maximum energy flows in accordance with claim 1 wherein the energy-releasing reaction is the decomposition of an excimer.

35. The method of producing maximum energy flows in accordance with claim 1 wherein the energy-releasing reacting is effected by an electron migration into the partially occupied inner d-orbital of compounds of the rare earths.

36. The method of producing maximum energy flows in accordance with claim 1 wherein the energy-rich reacting substances are compounds of the iodazide type.

* * * * *

UNITED STATES PATENT AND TRADEMARK OFFICE
CERTIFICATE OF CORRECTION

PATENT NO. : 5,493,972
DATED : February 27, 1996
INVENTOR(S) : Friedwart Winterberg et al It is certified that error appears in the above-indentified patent and that said Letters Patent is hereby corrected as shown below:

Column 8, line 17, please delete "X" and insert -- $\lambda$

Signed and Sealed this

Fourth Day of June, 1996

Attest:

BRUCE LEHMAN

Attesting Officer

Commissioner of Patents and Trademarks